US012743587B2

(12) United States Patent
Ke et al.

(10) Patent No.: US 12,743,587 B2
(45) Date of Patent: Sep. 22, 2026

(54) PERFORMANCE-AWARE IMAGE GENERATION BASED ON TEXT

(71) Applicant: GOOGLE LLC, Mountain View, CA (US)

(72) Inventors: Junjie Ke, Mountain View, CA (US); Feng Yang, Mountain View, CA (US); Xiaohang Li, Mountain View, CA (US); Chenyang Dai, Mountain View, CA (US); Yancheng Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 182 days.

(21) Appl. No.: 18/742,553

(22) Filed: Jun. 13, 2024

(65) Prior Publication Data

US 2025/0336123 A1 Oct. 30, 2025

Related U.S. Application Data

(60) Provisional application No. 63/640,631, filed on Apr. 30, 2024.

(51) Int. Cl.

| | |
|---|---|
| ***G06T 11/60*** | (2026.01) |
| ***G06F 40/40*** | (2020.01) |
| ***G06N 3/096*** | (2023.01) |

(52) U.S. Cl.
CPC .............. *G06T 11/60* (2013.01); *G06F 40/40* (2020.01); *G06N 3/096* (2023.01)

(58) Field of Classification Search
CPC .......... G06T 11/60; G06F 40/40; G06F 40/56; G06N 3/096
See application file for complete search history.

(56) References Cited

U.S. PATENT DOCUMENTS

| | | | | |
|---|---|---|---|---|
| 2016/0188997 | A1* | 6/2016 | Desnoyer | G06V 20/46 382/190 |
| 2025/0014314 | A1* | 1/2025 | Hamedi | G06F 16/438 |
| 2025/0225627 | A1* | 7/2025 | Rao | G06T 5/70 |
| 2025/0258878 | A1* | 8/2025 | Brewer | G06F 16/9532 |
| 2025/0265751 | A1* | 8/2025 | Singh | G06T 11/60 |

(Continued)

OTHER PUBLICATIONS

Utkarsh Doshi, "T21 Adapter: What is it?, How Does it Work? and Do We Really Need It?", Jul. 28, 2023, retrieved from the internet: https://medium.com/@utkarsh135/t2i-adapter-what-is-it-and-how-does-it-work-23b42ba99ed4#:~:text=T2I%20adapter%20is%20a%20simple,the%20encoder%20model%20of%20unet.

*Primary Examiner* — Grace Q Li
(74) *Attorney, Agent, or Firm* — MARSHALL, GERSTEIN & BORUN LLP

(57) ABSTRACT

A method of generating high-performance images includes generating, by one or more processors, a first plurality of captions each corresponding to a different one of a first plurality of images. Generating the first plurality of captions includes inputting the first plurality of images into a first generative artificial intelligence (AI) model. The method also includes training or finetuning, by the one or more processors, a second generative AI model using the first plurality of images and the first plurality of captions, and generating, by the one or more processors, a second plurality of images. Generating the second plurality of images includes inputting a plurality of text prompts into the trained or finetuned second generative AI model.

24 Claims, 7 Drawing Sheets

(56) References Cited

U.S. PATENT DOCUMENTS

| | | | | |
|---|---|---|---|---|
| 2025/0349042 | A1* | 11/2025 | Zhu | G06N 3/044 |
| 2025/0371348 | A1* | 12/2025 | Xie | G06N 3/08 |
| 2026/0004475 | A1* | 1/2026 | Zhu | G06T 11/00 |

* cited by examiner

PERFORMANCE-AWARE IMAGE GENERATION BASED ON TEXT

FIELD OF TECHNOLOGY

The present disclosure relates to image generation and, more specifically, to techniques for generating high-performing images based on text inputs.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

In recent years, significant progress has been made in the field of text-to-image (or "T2I") models, enabling the creation of captivating visual assets from textual descriptions or prompts. This technology has found widespread application in both personal and commercial domains. In some contexts, however, the primary purpose of images is not visual/aesthetic appeal, but rather to serve as strategic tools towards some other measurable goal. In the context of digital advertising, for example, the goal may be to maximize one or more performance measures such as "clicks" (users clicking on a digital advertisement) or "conversions" (users buying a product or service based on a viewed or selected digital advertisement). Because existing text-to-image models primarily (or solely) prioritize visual quality (e.g., aesthetic quality/appeal), they cannot be relied upon to generate images that also perform well based on other criteria.

SUMMARY

Generally, in the disclosed invention, a system trains or finetunes a text-to-image (T2I) generative artificial intelligence (AI) model by using training images known to be relatively high performing (e.g., in the digital advertising context, images known to have high click-through rates, high conversion rates, etc.). To provide associated text prompts for the training images, the disclosed system uses an image-to-text (I2T) generative AI model that generates text (referred to herein as a "caption") that describes each high-performing training image. The T2I and I2T generative AI models may include respective multimodal large language models (LLMs), for example.

Whereas conventional T2I models can do well at producing images that are visually pleasing, such images are not necessarily suited for good performance in the context of interest. For example, an aesthetically pleasing image that advertises a particular food product may not trigger as many user interactions (e.g., selecting the advertisement or buying the product) as a less aesthetically pleasing image that does a better job of capturing the viewer's attention or interest in other ways. By using high-performing training images for the training or finetuning, the system can output images that are more likely to perform well in digital advertising or other contexts of interest. Moreover, by using an I2T generative AI model to generate captions for the high-performance training images, it is possible to draw from a larger universe of images (e.g., past digital advertisements) for the training pool than would be possible if using only images that already have associated captions (e.g., captions provided by advertisers or other content sponsors).

In some implementations, the system pre-trains the T2I generative AI model on another (e.g., more generalized and/or larger) set of images, before finetuning the T2I generative AI model using the high-performing images and associated captions. This approach can be advantageous in that the T2I generative AI model can learn to understand more aspects of imagery, and/or better learn how to create aesthetically pleasing (or otherwise visually striking) images, than would be the case if only high-performing training images were used.

In some implementations where the system finetunes a pre-trained T2I generative AI model, the system generates, for each high-performing training image, a text prompt that includes not only the caption generated by the I2T generative AI model, but also a text indication of an image type for the image. For example, the text indication may be a prefix to the caption, saying "Online advertising image:" or other language having a similar meaning. Advantageously, this can enable the T2I generative AI model to learn (during the finetuning) the distinction between (1) aspects of imagery that enhance visual quality generally (e.g., aesthetic appeal), and (2) aspects of imagery that enhance performance (in the context of interest) irrespective of, or in synergy with, visual quality.

In some implementations, the system trains or finetunes the T2I generative AI model using not only high-performing training images and associated text prompts (e.g., associated captions or captions with prefixes), but also worse-performing training images, as well as performance labels for the images. For example, each training or finetuning image may be associated with a label having one of a set of discrete values (e.g., "high", "medium", or "low" as determined based on a performance metric and various thresholds), or having a floating point value within a range of values (e.g., a click through rate between 0.00 and 1.00), etc. Advantageously, this can enable the T2I generative AI model to learn not only what makes an image perform well in the desired context, but also what makes an image perform poorly in that context (i.e., what to avoid when generating an image).

Other advantages will also become apparent to one of ordinary skill in the art upon reading this disclosure and viewing the corresponding drawings.

In one aspect, a method of generating high-performance images includes: (1) generating, by one or more processors, a first plurality of captions each corresponding to a different one of a first plurality of images, wherein generating the first plurality of captions includes inputting the first plurality of images into a first generative artificial intelligence (AI) model; (2) training or finetuning, by the one or more processors, a second generative AI model using the first plurality of images and the first plurality of captions; and (3) generating, by the one or more processors, a second plurality of images, wherein generating the second plurality of images includes inputting a plurality of text prompts into the trained or finetuned second generative AI model.

In another aspect, one or more non-transitory, computer-readable media store instructions that, when executed by one or more processors of a computing system, cause the computing system to: (1) generate a first plurality of captions each corresponding to a different one of a first plurality of images, wherein generating the first plurality of captions includes inputting the first plurality of images into a first generative artificial intelligence (AI) model; (2) train or finetune a second generative AI model using the first plurality of images and the first plurality of captions; and (3) generate a second plurality of images, wherein generating the second plurality of images includes inputting a plurality of text prompts into the trained or finetuned second generative AI model.

DETAILED DESCRIPTION OF THE DRAWINGS

Figure 1:
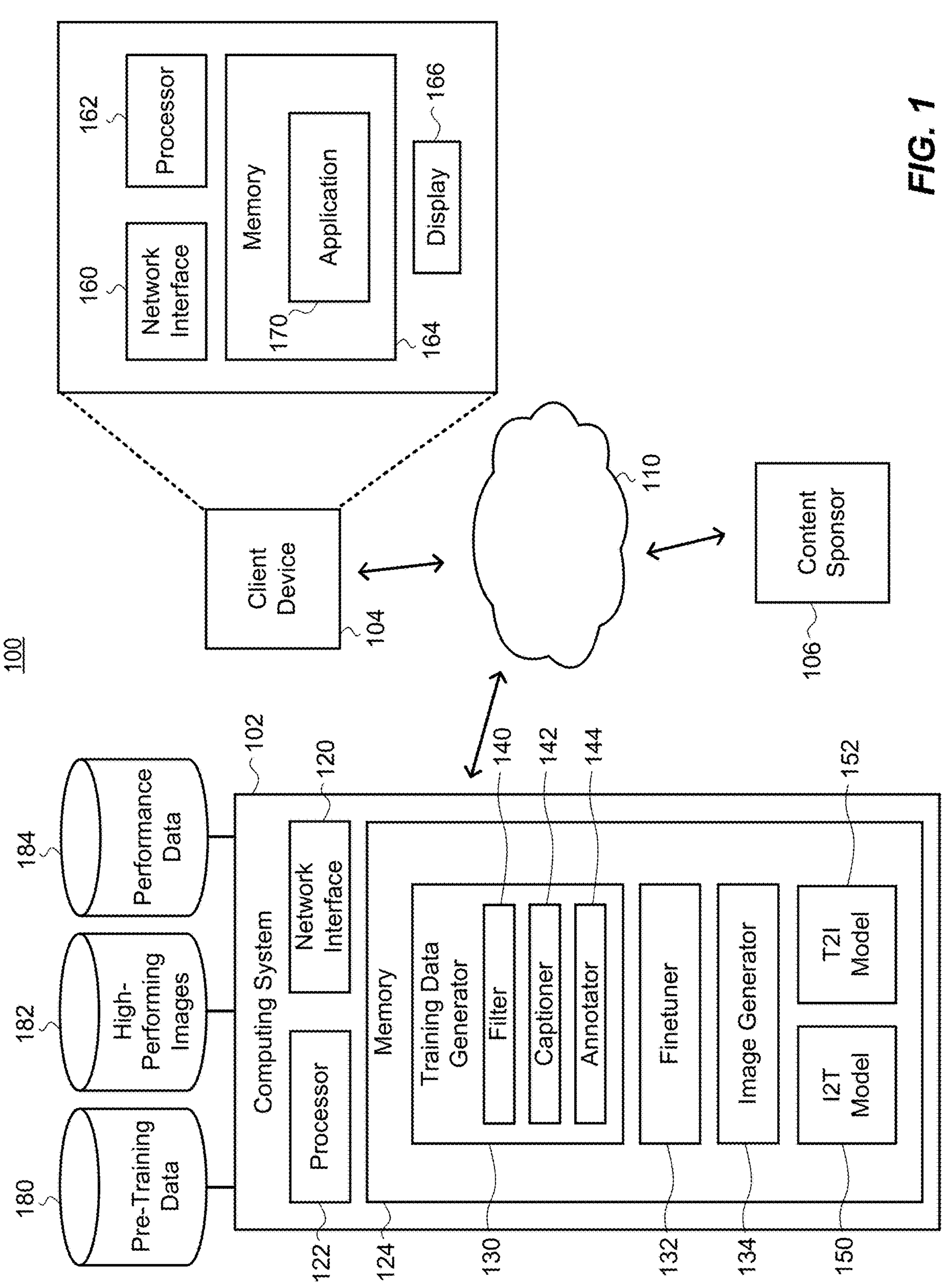
FIG. 1 is a block diagram of an example system in which techniques for generating high-performance images can be implemented.

FIG. 1 is a block diagram of an example system 100 in which techniques for performance-aware, text-based image generation can be implemented. The example system 100 includes a computing system 102, a client device 104, a content sponsor 106 (e.g., a server of a service provider or other content sponsor), and a network 110. The computing system 102 is remote from the client device 104 and content sponsor 106, and is communicatively coupled to the client device 104 and content sponsor 106 via the network 110. In some implementations, the system 100 omits the client device 104 and/or the content sponsor 106.

The network 110 may be a single communication network (e.g., the Internet), and in some implementations also includes one or more additional networks. As just one example, the network 110 may include a cellular network, the Internet, and a server-side local area network (LAN). While FIG. 1 shows only a single client device 104 and single content sponsor 106, it is understood that the computing system 102 may also be in communication with a number (e.g., millions) of other client devices that are generally similar to the client device 104, and/or in communication with a number (e.g., thousands) of other content sponsors that are generally similar to content sponsor 106.

Generally, computing system 102 can perform text-to-image operations/services, for the purpose of generating images intended to perform well in a particular context. In a digital advertising or marketing context, for example, computing system 102 may generate images that are intended to have good metrics with respect to user interaction, such as click-based metrics (e.g., click-through rate or "CTR"), conversion-based metrics (e.g., conversion rate of "CVR"), and/or other suitable metrics. As another example, computing system 102 may generate images that are intended to have good metrics with respect to facilitating viewer understanding (e.g., images for instructional materials), such as metrics that indicate the proportion of viewers that take the correct actions upon viewing the images. Other contexts are also possible. In general, however, the metrics indicate performance other than (or in addition to) mere visual or aesthetic quality as perceived by the viewer. For ease of explanation this disclosure primarily uses examples that are related to a digital advertising implementation/context.

The client device 104 is generally configured to access information resources (e.g., web pages and/or application user interfaces) that can present the images generated by computing system 102. For example, computing system 102 may generate digital advertisements that include (or consist entirely of) the generated images. Computing system 102 or another computing system may then serve the digital advertisements to users of client device 104 and/or other similar client devices using suitable techniques, such as conducting auctions (e.g., auctions based on keyword bids by advertisers, relevance metrics, etc.). The digital advertisements may be served in slots of web pages visited by the users, and/or slots of application user interfaces displayed to the users, etc.

The content sponsor 106 generally may commission or request that computing system 102 generate one or more images, and/or may provide the text upon which the image generation is based. For example, content sponsor 106 may be a digital advertiser who provides a snippet of text for each of a number of offered products or services, as part of one or more advertising campaigns owned by content sponsor 106. As a more specific example, content sponsor 106 may provide text such as: "An image of a woman on the beach. The woman is smiling and using her smartphone to take a picture of the setting sun."

The computing system 102 includes a network interface 120, a processor 122, and memory 124. The network interface 120 includes hardware, firmware, and/or software configured to enable the computing system 102 to exchange electronic data with the client device 104 and other, similar client devices (and possibly content sponsor 106, etc.) via the network 110. For example, the network interface 120 may include a wired or wireless router and a modem. The processor 122 may be a single processor (e.g., a central processing unit (CPU)), or may include multiple processors (e.g., multiple CPUs, or one or more CPUs and one or more graphics processing units (GPUs)). Computing system 102 may be a single computing device at a single location, or may include multiple, coordinating computing devices that are either co-located or remotely distributed.

The memory 124 is a computer-readable, non-transitory storage unit or device, or collection of such units/devices, that may include persistent and/or non-persistent memory components. The memory 124 stores instructions executable by processor 122 to perform various operations, including the instructions of various software applications and the data generated and/or used by such applications. In the example of FIG. 1, memory 124 stores the instructions of a training data generator 130, a finetuner 132, and an image generator 134. The training data generator 130 includes a filter 140, a captioner 142, and an annotator 144.

The memory 124 can also store generative artificial intelligence (AI) models. In particular, in the example of FIG. 1, memory 124 stores an image-to-text (I2T) model 150 operated or accessed by captioner 142, and a text-to-image (T2I) model 152 operated or accessed by image generator 134. It is understood that, in some implementations, memory 124 may omit one or more modules/elements shown in FIG. 1, such as filter 140 and/or annotator 144. It is also understood that, in some implementations, memory 124 may include one or more additional modules/elements not shown in FIG. 1, such as modules that facilitate serving images (e.g., digital advertisements) to users of devices such as client device 104.

The client device 104 may be or include any stationary, mobile, or portable computing device with wired and/or wireless communication capability (e.g., a smartphone, a tablet computer, a laptop computer, a desktop computer, a smart wearable device such as smart glasses or a smart watch, a vehicle head unit computer, etc.). In the example implementation of FIG. 1, client device 104 includes a network interface 160, a processor 162, memory 164, and a display 166. The processor 162 may be a single processor, or may include multiple processors.

The memory 164 includes one or more computer-readable, non-transitory storage units or devices, which may include persistent and/or non-persistent memory components. The memory 164 stores instructions that are executable by processor 162 to perform various operations, including the instructions of various software applications and the data generated and/or used by such applications.

In the example of FIG. 1, the memory 164 stores at least an application 170. Generally, application 170 is executed by processor 162 to provide one or more user interfaces via display 166, where the user interface(s) enable a user to access information resources that can include images generated by computing system 102. For example, application 170 may be a web browser application, and images generated by computing system 102 may be included in content slots of web pages visited by the user and presented on display 166. As a more specific example, the images may be digital advertisements dynamically selected by computing system 102 (or another computing system) and provided to client device 104 for insertion in the content slots. In other implementations, application 170 is a dedicated application (e.g., a "mobile app"), and images generated by computing system 102 are included in content slots of user interfaces presented by the application 170 on display 166.

The display 166 includes hardware, firmware, and/or software configured to enable a user to view visual outputs of the client device 104, and may use any suitable display technology (e.g., LED, OLED, LCD, etc.). In some implementations, the display 166 is incorporated in a touchscreen having both display and manual input capabilities. Moreover, in some implementations where the client device 104 is a wearable device, the display 166 is a transparent viewing component (e.g., lenses of smart glasses) with integrated electronic components. For example, the display 166 may include micro-LED or OLED electronics embedded in lenses of smart glasses.

The network interface 160 includes hardware, firmware, and/or software configured to enable the client device 104 to exchange electronic data with the computing system 102 via the network 110. For example, the network interface 160 may include a cellular communication transceiver, a WiFi transceiver, and/or transceivers for one or more other wired and/or wireless communication technologies.

While FIG. 1 shows client device 104 as a single component communicating directly (i.e., via network 110) with the computing system 102, in some implementations the subcomponents of client device 104 shown in FIG. 1 are instead divided among two or more user-side devices. As just one example, a pair of smart glasses may include the processor 162, the memory 164, and the display 166, while a smartphone may include another processing unit, another memory, another display, and the network interface 160. The smart glasses may then communicate as needed with the smartphone (e.g., via Bluetooth) to enable the operations described herein.

Returning to the computing system 102, the training data generator generally operates by generating data that is then used by finetuner 132 to finetune a pre-trained version of the T2I model 152, for the purpose of making the T2I model 152 a "performance-aware" model (i.e., a model that understands how to generate images that are more likely to perform well in a particular context other than, or in addition to, visual or aesthetic appeal). The computing system 102 may or may not additionally pre-train the T2I model 152, based on the implementation. In one implementation, for example, a pre-trained version of T2I model 152 is provided to computing system 102 by a different, remote computing system, and computing system 102 only performs finetuning. In other implementations, the computing system 102 performs the pre-training as well, using pre-training data in database 180.

To generate the training data for finetuning, training data generator 130 obtains (e.g., accesses, receives, etc.) a plurality of images that are known to have high performance from a database 182. The performance may be past performance that is a measure of user interest in a content item that includes (or consists of) the image. For example, the images in database 182 may be images that have at least a threshold CVR, CTR, and/or other performance metric(s) when used as (or within) digital advertisements. In other implementations, database 182 includes not only high-performing images, but also images known to have inferior performance. In such implementations, training data generator 130 may also use performance data in a database 184 to generate data for the finetuning. For example, the performance data may include a performance label (e.g., "good", "fair", or "poor", or floating point metric values, etc.) for each image in database 182. Training data generator 130 may generate the performance labels based on underlying performance metrics (e.g., by applying thresholds and possibly formulas), or the performance labels may be provided by another entity. In some implementations, the performance labels do not necessarily reflect past performance, and instead are predictions of future performance. For example, computing system 102 or another computing system may use one or more trained performance prediction machine learning models to predict how well each image will perform, and computing system 102 can use the resulting model outputs (or value derived from those outputs) as the performance labels for finetuning. In some implementations, databases 182 and 184 collectively form a single database storing tuples in the format <image, performance label>.

Filter 140 filters out, from a larger set of images in database 182, images that are not suitable for finetuning the T2I model 152. For example, filter 140 may remove or reject images that contain more than some threshold amount of text. Such filtering can mitigate difficulties that the T2I model 152 has with generating text images, and accommodate limitations in the ability of the I2T model 150 to generate captions that accurately describe textual elements within images.

For images that survive the filtering operation, captioner 142 operates or accesses the I2T model 150 to generate respective captions (i.e., text descriptive of the respective images). That is, captioner 142 inputs each image into the I2T model 150, and the I2T model 150 outputs the corresponding caption. An example caption is: "The image shows a variety of security cameras, including bullet cameras, turret cameras, and dome cameras." Another example caption is: "This is an image of a man in a suit inspecting a large yellow industrial machine. The machine has several gauges and valves, and is connected to a network of pipes and wires. The man is looking at the machine with a serious expression on his face."

The I2T model 150 may accept as input not only an image, but also a text prompt indicating that a caption is desired, and possibly also indicating one or more desired characteristics of the caption. For example, the text prompt may simply state: "Write a description for the image." In other examples, however, the text prompt may state "Write a short description for the image" or "Write a detailed description for the image." Generally, longer/detailed captions are less likely to omit key details, while shorter/generic captions are less likely to reflect hallucinations (e.g., stating that the image contains something that it does not contain). Thus, depending on the 12T model 150, it may be appropriate for the text prompt to request some intermediate level of detail. In some implementations, computing system 102 trains and/or finetunes the I2T model 150. For example, computing system 102 may finetune the I2T model 150 using images and corresponding captions where the captions are known to be of high quality.

Annotator 144 adds (e.g., as a prefix) text to the caption, where the added text indicates the image type for the respective image. This added text may be identical for all captions generated by captioner 142. For example, annotator 144 may add the text "Online advertising image:" before each caption. The annotation can enable the T2I model 152 to learn (during the finetuning) the distinction between aspects of imagery that enhance visual quality generally (e.g., aesthetic appeal) and aspects of imagery that enhance performance (in the context of interest) irrespective of, or in synergy with, visual quality.

Training data generator 130 may prepare the finetune training data as tuples, in the format <image, text prompt>, where the text prompt is the annotated caption (or, in implementations without annotator 144, just the caption itself). In implementations where performance labels are utilized, training data generator 130 may instead prepare the finetune training data as triplets, in the format <image, text prompt, performance label>. In still other implementations, one or more additional labels or other elements may be added to the format. For example, training data generator 130 may further obtain visual (e.g., aesthetic) quality indicators of images, and prepare the finetune training data in the format <image, text prompt, performance label, visual quality label>.

Once the finetune training data is prepared, finetuner 132 uses the data to finetune the (pre-trained) T2I model 152. If performance labels (and possibly also other types of labels) are provided as discussed above, finetuner 132 may use those labels as conditioning on the finetuning (e.g., using a T2I adapter), thereby enabling the T2I model 152 to draw insights from the various images and automatically learn the significance of the performance (and/or other) labels. In some implementations, finetuner 132 uses low-rank adaptation (LoRA) finetuning, which is an efficient technique for tailoring a foundational model (here, the pre-trained T2I model 152) to suit a new use case (here, generating high-performance images). Because LoRA finetuning can use a shared base model across finetuned variants, with only different LoRA weights being required during serving, the serving cost is lower in implementations that serve multiple versions of the T2I model 152. In other implementations, finetuner 132 uses a different finetuning technique, such as a full finetuning.

After finetuning, image generator 134 can use the T2I model 152 to generate high-performing images based on text inputs (e.g., text provided by content sponsor 106 and other, similar content sponsors). For example, content sponsor 106 may provide a short textual description of a desired advertisement image, and image generator 134 may input that text description into T2I model 152 to generate an image advertisement. In implementations where performance (and/or other) labels were used to condition the finetuning as discussed above, image generator 134 may automatically add, as input to the T2I model 152 (e.g., via one or more T2I adapters included within T2I model 152), one or more labels for each image being generated, with the label(s) reflecting the best (most desirable) level or value. If finetuning was conditioned on performance labels that can be "high", "medium", or "low", for example, image generator 134 uses the performance label "high" for each image to be generated. Alternatively, if finetuning was conditioned on performance labels that are predicted performance metrics (e.g., predicted by another machine learning model as discussed above), image generator 134 uses the best possible performance prediction for each image to be generated. As another example, if finetuning was further conditioned on visual quality labels that can be "high", "medium", or "low", image generator 134 may also (in addition to a performance label) use the visual label "high" for each image to be generated. In some implementations, before inputting text to the finetuned T2I model 152, image generator 134 automatically adds text (e.g., a prefix) corresponding to the text that was added by annotator 144 (e.g., "Prepare an online advertising image for:"), to allow the T2I model 152 to better understand what kind of image is desired.

As noted above, pre-training of the T2I model 152 may be performed by the computing system 102, or by another computing system. Regardless, it can be important to set an appropriate ratio of pre-training data to finetuning data, to prevent degradation and overfitting. In some implementations, the ratio of finetuning data to pre-training data is within the range of 1:4 to 1:2.

Both the I2T model 150 and the T2I model 152 may include multimodal LLMs each trained on a respective knowledge base/corpus. As discussed above, I2T model 150 and/or T2I model 152 may be pre-trained prior to finetuning, or fully trained without finetuning, depending on the implementation. Training and/or finetuning of the models 150 and/or 152 can include tuning model hyperparameters and/or other steps. In some implementations, the computing system 102 also performs or facilitates validation testing on the trained models 150 and/or 152 before putting the models to use. In various implementations, the T2I model 152 may be a latent diffusion model, a regular (non-latent) diffusion model, or another suitable type of T2I model.

Figure 2A:
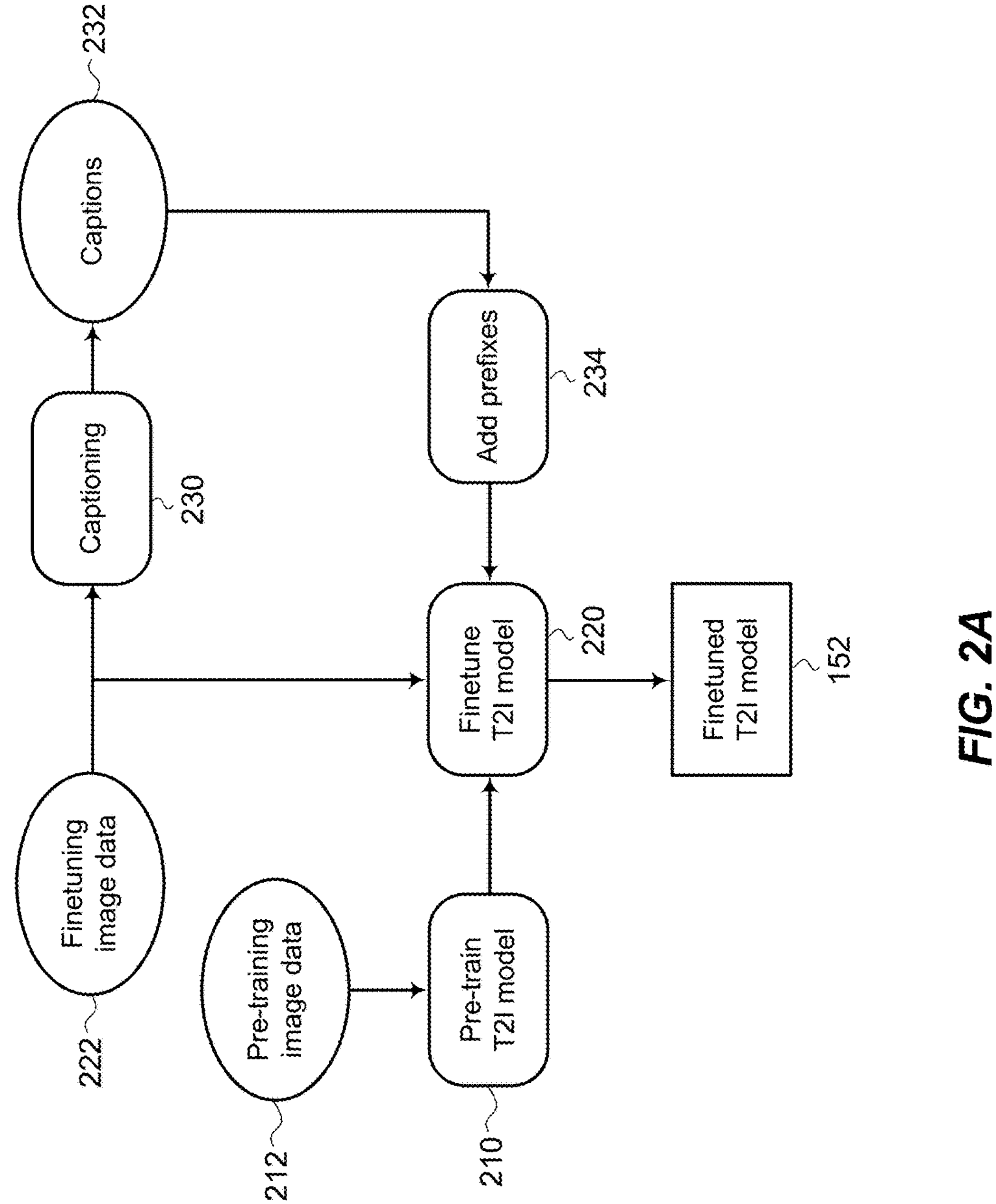
FIG. 2A depicts an example process for finetuning a T2I generative AI model using high-performing images.
Figure 2B:
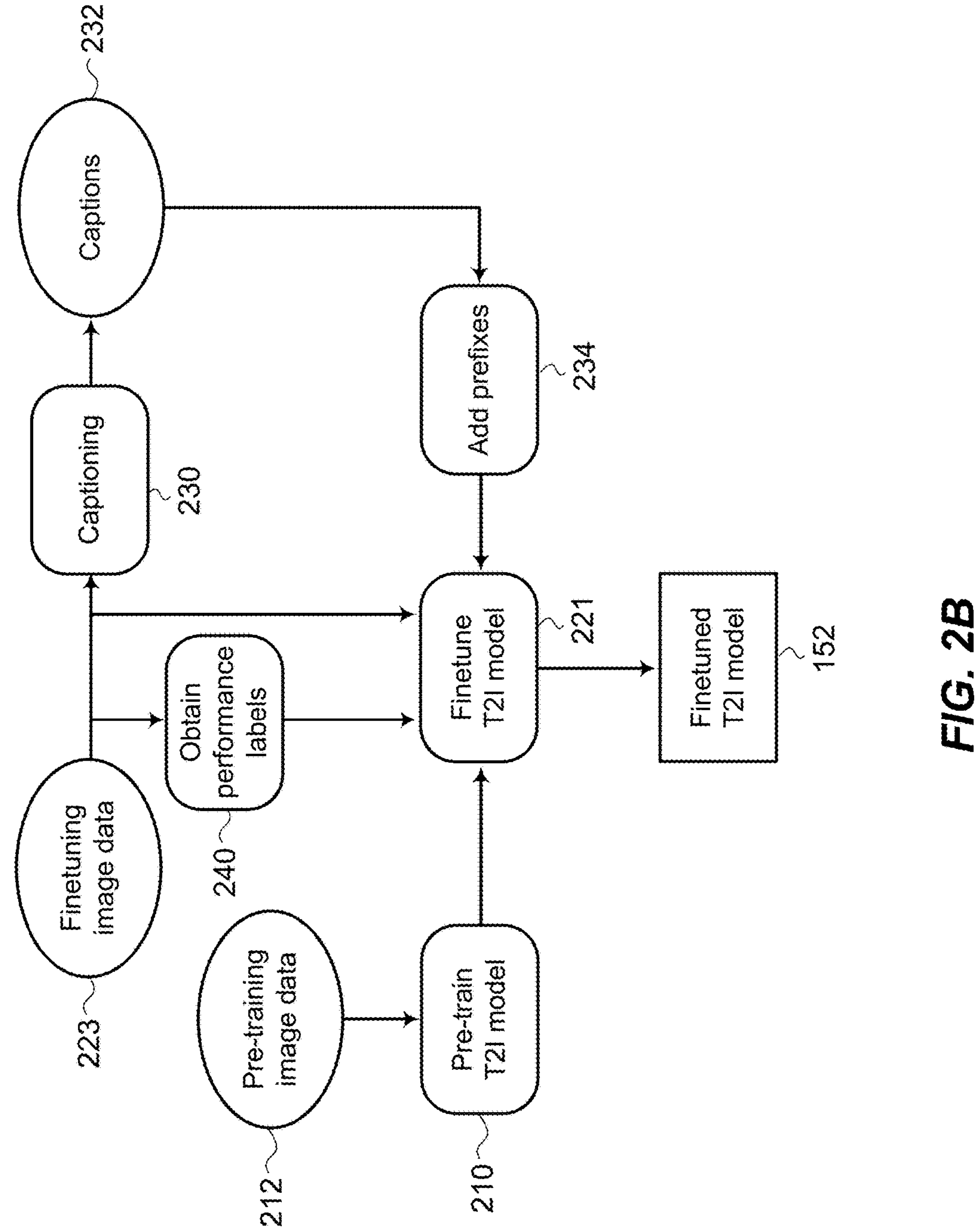
FIG. 2B depicts an example process for finetuning a T2I generative AI model using images with known performance and performance labels.

FIGS. 2A and 2B depict alternative processes for finetuning a pre-trained T2I generative AI model. It is understood that, in other implementations, certain techniques of FIG. 2A or FIG. 2B (e.g., using an I2T model for captioning of high-performing training images, and/or using performance labels) can instead be used to perform the initial training of a T2I generative AI model that was not pre-trained.

FIG. 2A depicts an example process 200A for finetuning a T2I generative AI model (in the depicted example, T2I model 152) using high-performing images. The process 200A may be implemented/performed by the computing system 102 of FIG. 1 (e.g., by software instructions of training data generator 130 and finetuner 132 as executed by processor 122), or by another suitable computing system.

For ease of explanation, the process 200A is explained below with reference to elements of the system 100 of FIG. 1.

At stage 210 of the process 200A, the computing system 102 pre-trains the T2I model 152 using pre-training image data 212 (e.g., from database 180). As noted above, in some implementations a separate computing system instead pre-trains the T2I model 152. In any case, the pre-training image data 212 may include a very large set of images with associated text/captions. The pre-training at stage 210 may or may not use labels indicating visual quality of the images in the pre-training image data 212, depending on the implementation.

At stage 220, the computing system 102 finetunes the pre-trained T2I model 152 using finetuning image data 222 (e.g., from database 182). The finetuning image data 222 includes images that are known to be associated with good/high performance (e.g., based on known/measured past performance, and/or based on future performance as predicted by a machine learning model). The finetuning at stage 220 also utilizes text prompts associated with the images in finetuning image data 222. To provide these text prompts, at stage 230, the computing system 102 generates a caption for each image using the I2T model 150 as discussed above, resulting in the captions 232 where each caption corresponds to a different, respective image. In the implementation of FIG. 2A, at stage 234, the computing system 102 adds a prefix indicating the type of image being used for finetuning (e.g., "This is an online advertising image:" or "This is an advertising image presented in a user interface provided by a mobile app:" etc.). As discussed above, the prefix may instead be a different type of annotation other than a prefix, or the annotation may be omitted entirely (i.e., stage 234 is omitted).

Whether annotated or not, the captions 232 are then used by computing system 102, along with the corresponding images, to finetune the T2I model 152 at stage 220, resulting in a finetuned version of the T2I model 152 that can be used (e.g., by image generator 134) to generate images based on text provided by content sponsor 106 and/or other entities. As discussed above, the images may then be selected and presented (e.g., as digital advertisements) to users of client devices, such as the user of client device 104 (via application 170 and display 166).

FIG. 2B depicts an alternative example process 200B for finetuning a T2I generative AI model (in the depicted example, T2I model 152) using images with known performance and corresponding performance labels. The process 200B may be implemented/performed by the computing system 102 of FIG. 1 (e.g., by software instructions of training data generator 130 and finetuner 132 as executed by processor 122), or by another suitable computing system. For ease of explanation, the process 200B is explained below with reference to elements of the system 100 of FIG. 1.

Stage 210, and pre-training image data 212, may be the same as or similar to the like-labeled elements of FIG. 2A. Thus, the pre-trained T2I model 152 may be no different for process 200B than for process 200A. At stage 221 of the process 200B, the computing system 102 finetunes the pre-trained T2I model 152 using finetuning image data 223 (e.g., from database 182 and database 184). The finetuning image data 223 includes images known to be associated with good/high performance, as well as images known to be associated with one or more other, lesser performance levels. The performance levels may be based on known/measured past performance, and/or based on future performance as predicted by a machine learning model. In the example of FIG. 2B, the computing system 102 obtains performance labels indicating these performance levels at stage 240. Stage 240 may include retrieving the performance labels from a database (e.g., database 182 or 184), or generating the performance labels (e.g., based on historical metrics for the images and appropriate threshold values, or by applying the images to a performance-predicting machine learning model, etc.).

In addition to the images and associated performance labels, the finetuning at stage 221 utilizes text prompts associated with the images in finetuning image data 223. To provide the prompts for the images in finetuning image data 223, the computing system 102 generates a caption for each image using the I2T model 150, at stage 230. Optionally, at stage 234, the computing system 102 generates the final text prompts by adding a prefix (or other annotation) indicating the image type. Stages 230 and 234, and captions 232, may be the same as or similar to the like-labeled elements of FIG. 2A.

Whether annotated or not, the captions 232 are then used by computing system 102, along with the corresponding images and performance labels, to finetune the T2I model 152 at stage 221, resulting in a finetuned version of the T2I model 152 that can be used (e.g., by image generator 134) to generate images based on text provided by content sponsor 106 and/or other entities. As discussed above, the images may then be selected and presented (e.g., as digital advertisements) to users of client devices, such as the user of client device 104 (via application 170 and display 166).

Figure 3A:
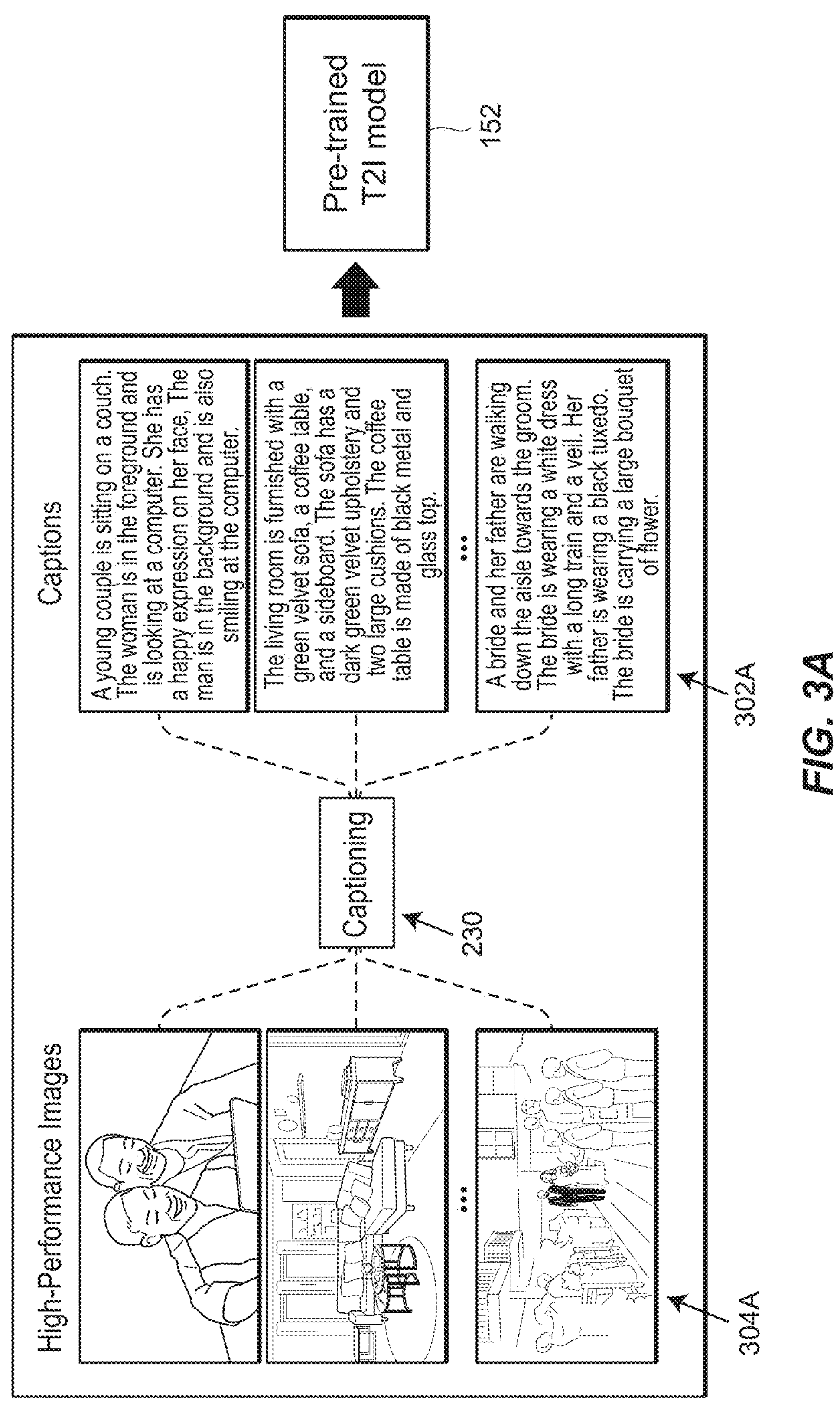
FIG. 3A depicts an example scenario in which the captioner generates captions for high-performing images, within the process of FIG. 2A.

FIG. 3A depicts an example scenario 300A in which the captioner 142 generates captions 302A for high-performing images 304A, at stage 230 of the process 200A. The captions 302A and corresponding images 304A are used to finetune the pre-trained T2I model 152 (i.e., at stage 220 of process 200A).

Figure 3B:
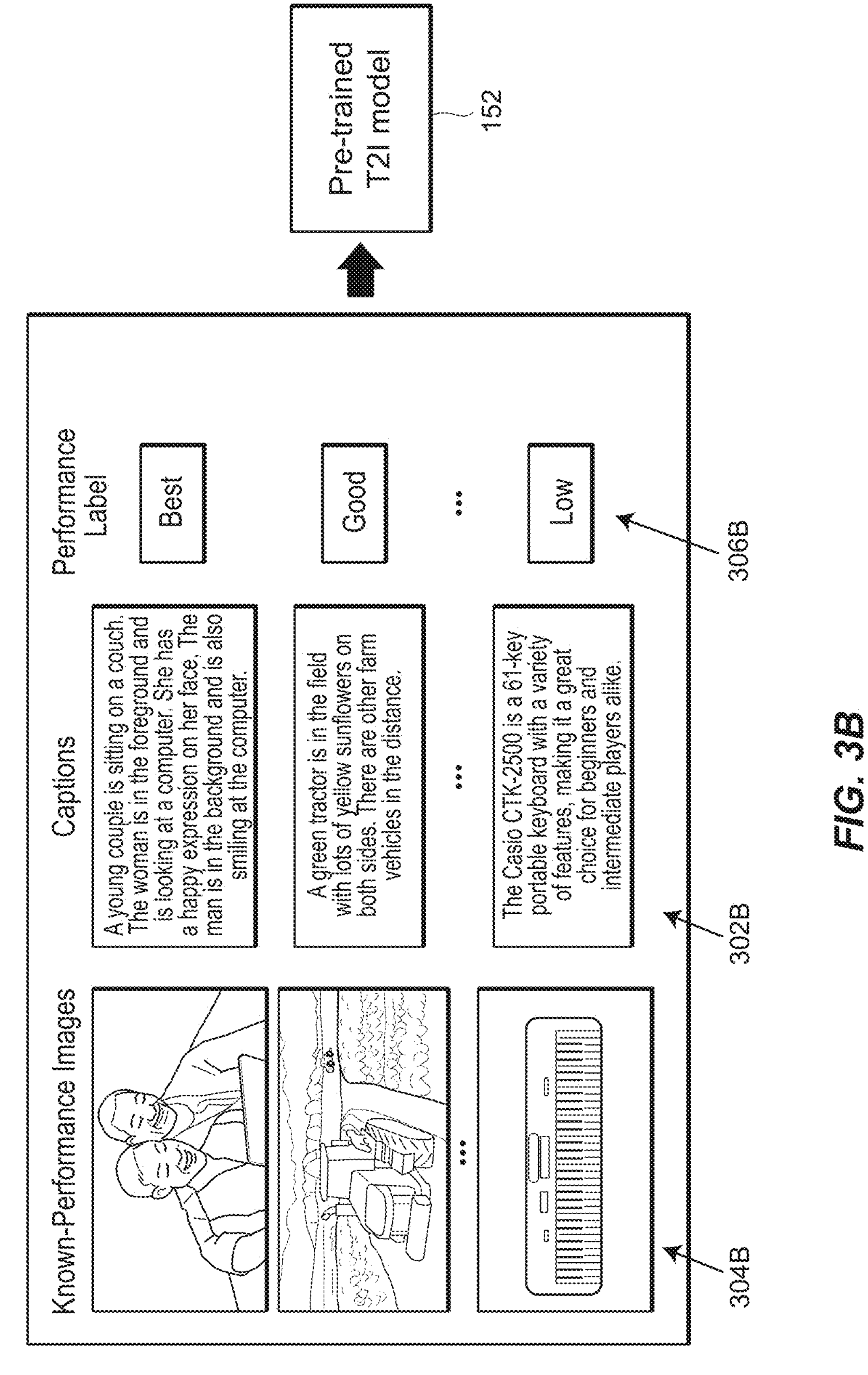
FIG. 3B depicts an example scenario in which the captioner generates captions for images with differing performance, within the process of FIG. 2B.

FIG. 3B depicts an example scenario 300B in which the captioner 142 generates captions 302B for images 304B with differing (past or predicted) performance, at stage 230 of the process 200B. In the example of FIG. 3B, the performance is reflected by performance labels 306B having one of three possible values: "BEST", "GOOD", or "LOW". The captions 302B, images 304B, and performance labels 306B are used to finetune the pre-trained T2I model 152 (i.e., at stage 221 of process 200B).

Figure 4:
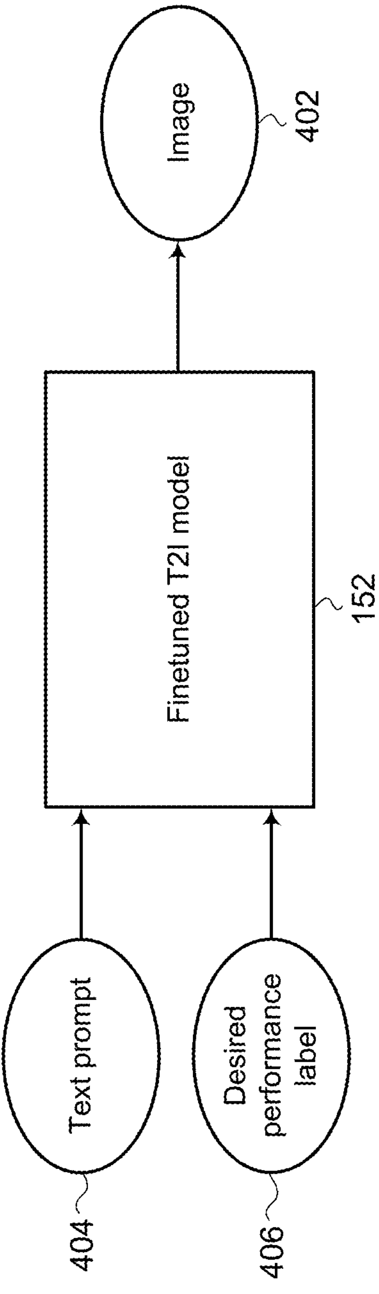
FIG. 4 depicts an example data flow in which a finetuned T2I generative AI model is used to generate a high-performance image from a text prompt and corresponding desired performance label.

FIG. 4 depicts an example data flow 400 in which a finetuned T2I generative AI model (in this example, finetuned T2I model 152) is used to generate a high-performance image 402 from a text prompt 404 and a corresponding desired performance label 406. The data flow 400 may be implemented by the image generator 134, for example. The text prompt 404 may be of a form similar to a caption of captions 232 of process 200A or 200B, or a form similar to an annotated caption as output by stage 234 of process 200A or 200B. The desired performance label 406 may be of a form (i.e., have one of the possible values for) the performance labels obtained at stage 240. In particular, the desired performance label 406 preferably has a value corresponding to the best possible (best available) performance label (e.g., "BEST"). In other implementations (e.g., corresponding to the implementation of process 200A), the data flow 400 omits the desired performance label 406.

Figure 5:
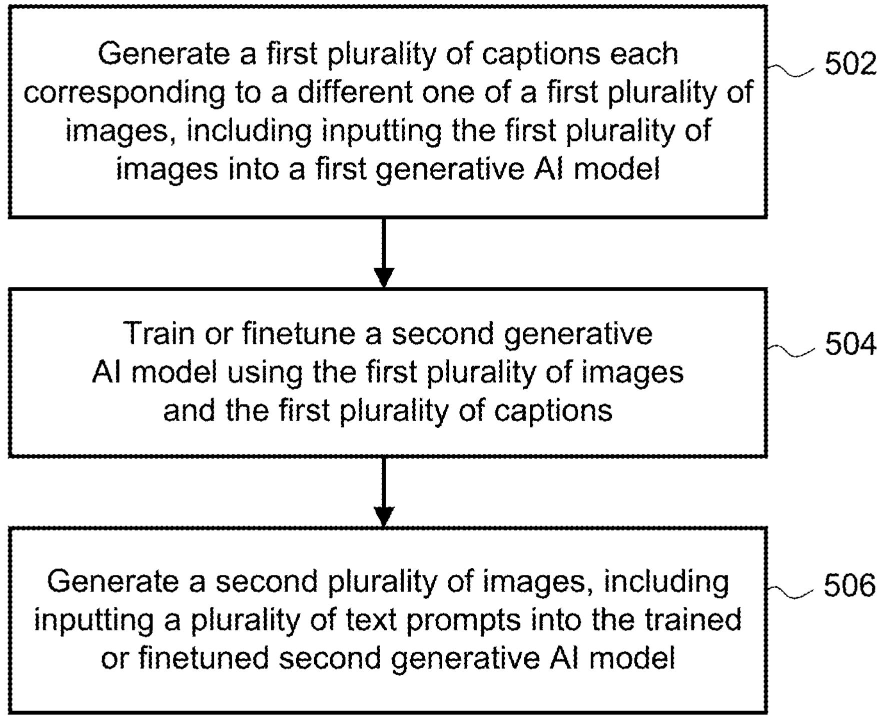
FIG. 5 is a flow diagram of an example method for generating high-performance images.

FIG. 5 is a flow diagram of an example method 500 for generating high-performance images. The method 500 may be implemented by the computing system 102 (e.g., training data generator 130, finetuner 132, and image generator 134) of FIG. 1, for example.

At block 502, a first plurality of captions is generated, with each caption corresponding to a different one of a first plurality of images. Block 502 includes inputting the first plurality of images into a first generative AI model (e.g., 12T model 150). Block 502 may correspond to stage 230 of FIG. 2A or FIG. 2B, for example.

At block 504, a second generative AI model (e.g., T2I model 152) is trained or finetuned using the first plurality of images and the first plurality of captions. Block 504 may include using performance labels (and possibly also other labels), as discussed above. Block 504 may also include using the captions directly for the training or finetuning, or generating other text prompts based on the captions (e.g., using annotator 144) and then using the generated text prompts for the training or finetuning. Block 504 may correspond to stage 220 of FIG. 2A or stage 221 of FIG. 2B, for example.

At block 506, a second plurality of images is generated. Block 506 includes inputting a plurality of text prompts into the trained or finetuned second generative AI model. The plurality of text prompts may have a format the same as or similar to the captions (or caption-derived text prompts such as annotated captions) that were used to train or finetune the second generative AI model at block 504, for example. Block 506 may correspond to multiple iterations (using different text prompts and/or desired performance labels) of the data flow 400 of FIG. 4, for example.

The method 500 may include one or more additional blocks. For example, the method 500 may include an additional block in which images of the first plurality of images are identified, at least in part by filtering out, from a larger set of images (e.g., in database 182), images containing more than a threshold amount of text items. As another example, the method 500 may include an additional block in which the first generative AI model is trained or finetuned using a third plurality of images and a second plurality of captions, where each of the second plurality of captions corresponds to a different one of the third plurality of images.

It is understood that the blocks of FIG. 5 need not be performed strictly in the order shown. For example, blocks 502, 504, and/or 506 may overlap in time, with certain images of the second plurality of images being generated (block 506) before some captions of the first plurality of captions are generated (block 502) and/or used to train or finetune the second generative AI model (block 504).

As is apparent from the above description, techniques disclosed herein use artificial intelligence to generate high-performing images. Artificial intelligence (AI) is a segment of computer science that focuses on the creation of models that can perform tasks with little to no human intervention. Artificial intelligence systems can utilize, for example, machine learning, natural language processing, and computer vision. Machine learning, and its subsets, such as deep learning, focus on developing models that can infer outputs from data. The outputs can include, for example, predictions and/or classifications. Natural language processing focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

The model(s) can be pre-trained before domain-specific alignment. For instance, a model can be pretrained over a general corpus of training data and fine-tuned on a more targeted corpus of training data. A model can be aligned using prompts that are designed to elicit domain-specific outputs. Prompts can be designed to include learned prompt values (e.g., soft prompts). The trained model(s) may be validated prior to their use using input data other than the training data, and may be further updated or refined during their use based on additional feedback/inputs.

In some implementations, the computing system 102 may use one or more of the machine learning models noted above to perform any one or more of the operations discussed herein in connection with machine learning. For example, the computing system 102 may use one or more such machine learning models to pre-train and/or finetune the I2T model 150 and/or T2I model 152, and possibly to pre-train and/or finetune a model that predicts performance of an image (e.g., to generate performance labels as discussed above), etc.

Although the foregoing text sets forth a detailed description of numerous different aspects and implementations of the invention, it should be understood that the scope of the patent is defined by the words of the claims set forth at the end of this patent. The detailed description is to be construed as exemplary only and does not describe every possible implementation because describing every possible implementation would be impractical, if not impossible. Numerous alternative implementations could be implemented, using either current technology or technology developed after the filing date of this patent, which would still fall within the scope of the claims. The disclosure herein contemplates at least the following examples:

Example 1. A method of generating high-performance images, the method comprising: generating, by one or more processors, a first plurality of captions each corresponding to a different one of a first plurality of images, wherein generating the first plurality of captions includes inputting the first plurality of images into a first generative artificial intelligence (AI) model; training or finetuning, by the one or more processors, a second generative AI model using the first plurality of images and the first plurality of captions; and generating, by the one or more processors, a second plurality of images, wherein generating the second plurality of images includes inputting a plurality of text prompts into the trained or finetuned second generative AI model.

Example 2. The method of example 1, wherein the first generative AI model comprises a first large language model (LLM) and the second generative AI model comprises a second LLM.

Example 3. The method of example 1, wherein training or finetuning the second generative AI model further includes using a plurality of performance labels each corresponding to a different one of the first plurality of images.

Example 4. The method of example 3, wherein each label of the plurality of performance labels is indicative of past performance of a respective image of the first plurality of images, and wherein the past performance is a measure of user interest in a content item that included the respective image.

Example 5. The method of example 3, wherein each label of the plurality of performance labels is indicative of predicted performance of a respective image of the first plurality of images.

Example 6. The method of example 3, wherein generating the second plurality of images further includes inputting a plurality of desired performance labels into the trained or finetuned second generative AI model, each of the plurality of desired performance labels corresponding to a different one of the plurality of text prompts.

Example 7. The method of example 3, wherein training or finetuning the second generative AI model further includes using a plurality of visual quality labels each corresponding to a different one of the first plurality of images.

Example 8. The method of example 1, wherein training or finetuning the second generative AI model includes: generating a plurality of training or finetuning text prompts each including (i) a different one of the first plurality of captions, and (ii) a text indication of an image type of the image, of the first plurality of images, that corresponds to the different one of the first plurality of captions; and training or finetuning the second generative AI model using the first plurality of images and the plurality of training or finetuning text prompts.

Example 9. The method of example 1, wherein the second generative AI model is a pre-trained model, and wherein training or finetuning the second generative AI model includes finetuning the pre-trained model.

Example 10. The method of example 9, wherein finetuning the pre-trained model includes using low-rank adaptation (LoRA) finetuning to finetune the pre-trained model.

Example 11. The method of example 1, further comprising: identifying, by the one or more processors, the first plurality of images, wherein identifying the first plurality of images includes filtering out, from a larger set of images, images containing more than a threshold amount of text.

Example 12. The method of example 1, further comprising: training or finetuning, by the one or more processors, the first generative AI model using a third plurality of images and a second plurality of captions, each of the second plurality of captions corresponding to a different one of the third plurality of images.

Example 13. A computing system comprising: one or more processors; and one or more non-transitory, computer-readable memories storing instructions that, when executed by the one or more processors, cause the computing system to perform the method of any one of examples 1-12.

Example 14. A non-transitory, computer-readable medium storing instructions that, when executed by one or more processors of a computing system, cause the computing system to perform the method of any one of examples 1-12.

The following additional considerations apply to the foregoing discussion and the appended claims. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first set of one or more processors (e.g., in a first computing device) generates X and a distinct, second set of one or more processors (e.g., in a different, second computing device) independently generates Y; (2) implementations in which the same set of one or more processors (e.g., all in the same device, or distributed among multiple devices) generates both X and Y; and (3) other variations.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or implementation. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs through the principles described herein. Thus, while particular implementations and applications have been illustrated and described, it is to be understood that the disclosed implementations are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method of generating high-performance images, the method comprising:

generating, by one or more processors, a first plurality of captions each corresponding to a different one of a first plurality of images, wherein generating the first plurality of captions includes inputting the first plurality of images into a first generative artificial intelligence (AI) model;

training or finetuning, by the one or more processors, a second generative AI model by:

generating a plurality of training or finetuning text prompts each including (i) a different one of the first plurality of captions, and (ii) a text indication of an image type of the image, of the first plurality of images, that corresponds to the different one of the first plurality of captions; and using the first plurality of images and the generated plurality of training or finetuning text prompts; and generating, by the one or more processors, a second plurality of images, wherein generating the second plurality of images includes inputting a plurality of text prompts into the trained or finetuned second generative AI model.

2. The method of claim 1, wherein the first generative AI model comprises a first large language model (LLM) and the second generative AI model comprises a second LLM.

3. The method of claim 1, wherein training or finetuning the second generative AI model further includes using a plurality of performance labels each corresponding to a different one of the first plurality of images.

4. The method of claim 3, wherein each label of the plurality of performance labels is indicative of past performance of a respective image of the first plurality of images, and wherein the past performance is a measure of user interest in a content item that included the respective image.

5. The method of claim 3, wherein each label of the plurality of performance labels is indicative of predicted performance of a respective image of the first plurality of images.

6. The method of claim 3, wherein generating the second plurality of images further includes inputting a plurality of desired performance labels into the trained or finetuned second generative AI model, each of the plurality of desired performance labels corresponding to a different one of the plurality of text prompts.

7. The method of claim 3, wherein training or finetuning the second generative AI model further includes using a plurality of visual quality labels each corresponding to a different one of the first plurality of images.

8. The method of claim 1, wherein the second generative AI model is a pre-trained model, and wherein training or finetuning the second generative AI model includes finetuning the pre-trained model.

9. The method of claim 8, wherein finetuning the pre-trained model includes using low-rank adaptation (LoRA) finetuning to finetune the pre-trained model.

10. The method of claim 1, further comprising:

identifying, by the one or more processors, the first plurality of images, wherein identifying the first plurality of images includes filtering out, from a larger set of images, images containing more than a threshold amount of text.

11. The method of claim 1, further comprising:

training or finetuning, by the one or more processors, the first generative AI model using a third plurality of images and a second plurality of captions, each of the second plurality of captions corresponding to a different one of the third plurality of images.

12. One or more non-transitory, computer-readable media storing instructions that, when executed by one or more processors of a computing system, cause the computing system to:

generate a first plurality of captions each corresponding to a different one of a first plurality of images, wherein generating the first plurality of captions includes inputting the first plurality of images into a first generative artificial intelligence (AI) model;

train or finetune a second generative AI model by:

generating a plurality of training or finetuning text prompts each including (i) a different one of the first plurality of captions, and (ii) a text indication of an image type of the image, of the first plurality of images, that corresponds to the different one of the first plurality of captions; and using the first plurality of images and the generated plurality of training or finetuning text prompts; and generate a second plurality of images, wherein generating the second plurality of images includes inputting a plurality of text prompts into the trained or finetuned second generative AI model.

13. The one or more non-transitory, computer-readable media of claim 12, wherein the first generative AI model comprises a first large language model (LLM) and the second generative AI model comprises a second LLM.

14. The one or more non-transitory, computer-readable media of claim 12, wherein training or finetuning the second generative AI model further includes using a plurality of performance labels each corresponding to a different one of the first plurality of images.

15. The one or more non-transitory, computer-readable media of claim 14, wherein each label of the plurality of performance labels is indicative of past performance of a respective image of the first plurality of images, and wherein the past performance is a measure of user interest in a content item that included the respective image.

16. The one or more non-transitory, computer-readable media of claim 14, wherein each label of the plurality of performance labels is indicative of predicted performance of a respective image of the first plurality of images.

17. The one or more non-transitory, computer-readable media of claim 14, wherein generating the second plurality of images further includes inputting a plurality of desired performance labels into the trained or finetuned second generative AI model, each of the plurality of desired performance labels corresponding to a different one of the plurality of text prompts.

18. The one or more non-transitory, computer-readable media of claim 14, wherein training or finetuning the second generative AI model further includes using a plurality of visual quality labels each corresponding to a different one of the first plurality of images.

19. The one or more non-transitory, computer-readable media of claim 12, wherein the second generative AI model is a pre-trained model, and wherein training or finetuning the second generative AI model includes finetuning the pre-trained model.

20. The one or more non-transitory, computer-readable media of claim 19, wherein finetuning the pre-trained model includes using low-rank adaptation (LoRA) finetuning to finetune the pre-trained model.

21. The one or more non-transitory, computer-readable media of claim 12, wherein the instructions further cause the computing system to:

identify the first plurality of images, wherein identifying the first plurality of images includes filtering out, from a larger set of images, images containing more than a threshold amount of text.

22. The one or more non-transitory, computer-readable media of claim 12, wherein the instructions further cause the computing system to:

train or finetune the first generative AI model using a third plurality of images and a second plurality of captions, each of the second plurality of captions corresponding to a different one of the third plurality of images.

23. A system comprising:

one or more processors; and memory storing instructions that, when executed by the one or more processors, cause the one or more processors to:

generate a first plurality of captions each corresponding to a different one of a first plurality of images, wherein generating the first plurality of captions includes inputting the first plurality of images into a first generative artificial intelligence (AI) model;

train or finetune a second generative AI model by:

generating a plurality of training or finetuning text prompts each including (i) a different one of the first plurality of captions, and (ii) a text indication of an image type of the image, of the first plurality of images, that corresponds to the different one of the first plurality of captions; and using the first plurality of images and the generated plurality of training or finetuning text prompts; and generate a second plurality of images, wherein generating the second plurality of images includes inputting a plurality of text prompts into the trained or finetuned second generative AI model.

24. The system of claim 23, wherein the first generative AI model comprises a first large language model (LLM) and the second generative AI model comprises a second LLM.

* * * * *